(12) United States Patent
He et al.

(10) Patent No.: US 7,666,247 B2
(45) Date of Patent: Feb. 23, 2010

(54) METHODS FOR SPHERICALLY GRANULATING AND AGGLOMERATING METAL PARTICLES, AND THE METAL PARTICLES PREPARED THEREBY, ANODES MADE FROM THE METAL PATRICLES

(75) Inventors: Jilin He, Shizuishan (CN); Luntao Pan, Shizuishan (CN); Aiguo Zheng, Shizuishan (CN); Yuewei Cheng, Shizuishan (CN); Yuezhong Ma, Shizuishan (CN); Hongdong Liu, Shizuishan (CN); Guoqi Yang, Shizuishan (CN); Chunxiang Wang, Shizuishan (CN); Yanping Wang, Shizuishan (CN); Shiping Zheng, Shizuishan (CN)

(73) Assignee: Ningxia Orient Tantalum Industry Co., Ltd., Shizuishan (CN)

( * ) Notice: Subject to any disclaimer, the term of this patent is extended or adjusted under 35 U.S.C. 154(b) by 397 days.

(21) Appl. No.: 11/356,723

(22) Filed: Feb. 17, 2006

(65) Prior Publication Data

US 2007/0068341 A1 Mar. 29, 2007
US 2007/0193409 A2 Aug. 23, 2007

(30) Foreign Application Priority Data

Sep. 29, 2005 (CN) .................. 2005 1 0108062

(51) Int. Cl.
*B22F 1/00* (2006.01)
(52) U.S. Cl. .............. 75/252; 419/30; 419/32
(58) Field of Classification Search ............ 75/342, 75/354, 363, 252; 419/30, 32
See application file for complete search history.

(56) References Cited

U.S. PATENT DOCUMENTS

| | | | |
|---|---|---|---|
| 3,881,911 A * | 5/1975 | Cheney et al. | 75/255 |
| 3,934,179 A * | 1/1976 | Pierret | 361/529 |
| 4,017,302 A * | 4/1977 | Bates et al. | 75/245 |
| 4,141,719 A * | 2/1979 | Hakko | 361/529 |
| 5,082,491 A | 1/1992 | Rerat | |
| 6,576,038 B1 * | 6/2003 | Rao | 75/255 |
| 6,689,187 B2 * | 2/2004 | Oda | 75/255 |
| 6,786,951 B2 | 9/2004 | He et al. | |
| 2005/0025699 A1 * | 2/2005 | Reed et al. | 423/594.17 |

FOREIGN PATENT DOCUMENTS

| | | |
|---|---|---|
| CN | 1197707 A | 11/1998 |
| CN | 1238251 A | 12/1999 |
| JP | 4-362101 A | 12/1992 |
| JP | 5-65502 A | 3/1993 |
| WO | WO 99/61184 A1 | 12/1999 |

* cited by examiner

Primary Examiner—Roy King
Assistant Examiner—Ngoclan T Mai
(74) Attorney, Agent, or Firm—Christensen O'Connor Johnson Kindness PLLC

(57) ABSTRACT

A method for spherically granulating and agglomerating metal particles such as tantalum and/or niobium powders is described in the present invention, which includes the steps of: a). comminuting the metal particles to form fine particles having D50 less than 50 μm; b). granulating the comminuted metal particles comprising volatile liquid, for example, tantalum and/or niobium particles comprising volatile liquid, to form wet spherical particles; c). still drying the wet spherical particles and removing volatile liquid to form flowable pre-agglomerated particles with increased bulk density; d). heat treating the pre-agglomerated particles; e). screening the heat treated powder to obtain the flowable agglomerated particles. The present invention provides a flowable spherical agglomerated metal particles, and especially tantalum and/or niobium particles having improved properties. The present agglomerated tantalum powder have a flow rate of at least about 2.0 g/sec, a BET surface area of from about 0.2 to about 6.0 $m^2$/g, a FSSS of at least 1.0 μm, a Scott bulk density of from about 1.2 g/$cm^3$ to about 5.5 g/$cm^3$. The present agglomerated niobium powder have a flow rate of at least about 1.0 g/sec, a BET surface area of from about 0.5 to about 8.0 $m^2$/g, a FSSS of at least 1.0 μm, a Scott bulk density of from about 0.7 g/$cm^3$ to about 3.5 g/$cm^3$. Said tantalum and/or niobium metal particles have improved pore size distribution of the sintered anodes and increased pellet crush strength. The present invention further provides an electrolytic capacitor anodes made from the tantalum and/or niobium particles according to the present invention having a capacitance of from about 5,000 μFV/g to about 300,000 μFV/g.

15 Claims, 4 Drawing Sheets

METHODS FOR SPHERICALLY GRANULATING AND AGGLOMERATING METAL PARTICLES, AND THE METAL PARTICLES PREPARED THEREBY, ANODES MADE FROM THE METAL PATRICLES

FIELD OF THE INVENTION

The present invention relates to methods for spherically granulating and agglomerating metal particles and the metal particles prepared thereby, anodes made from the metal particles, especially relates to methods for spherically granulating and agglomerating metal tantalum and/or niobium particles, and the tantalum and/or niobium metal particles having improved properties prepared thereby, and anodes for electrolytic capacitors made from the metal tantalum and/or niobium particles.

BACKGROUND OF THE INVENTION

Along with the development of the electronics industry, which requests the electronic components having high performance and miniaturization, as for the sintered tantalum and/or niobium electrolytic capacitor must be having high capacitance (CV) in unit volume and in unit weight of the powder. This will need using high BET (Brurauer-Emmet-Teller) surface area tantalum and/or niobium powders which have fine primary particles to manufacture the capacitor anode.

The tantalum, niobium metal powders are usually produced by chemical reduction of a tantalum or niobium compound with a reducing agent or by hydrogenating the tantalum or niobium metal ingot and pulverizing the hydrogenated ingot. The tantalum, niobium metal powders prepared by the former process are porous basic agglomerates having high BET surface area comprised of many primary particles, and the later process generally produces powders with high purity but low surface area.

The parameters for characterizing the size of the metal particles include BET surface area ($m^2/g$) measured by the liquid nitrogen adsorbed, Fisher sub-sieve particle size (FSSS/$\mu m$), powder particle size distribution measured with a laser particle size distribution analyzer, particle size and morphology measured with scanning electron microscopy and transmission electron microscopy. The BET surface area is associated with the particle size. The finer the primary particles are, the larger the BET surface area is, and generally the higher the capacitance of the powder has. The FSSS is derived through measuring the speed of air passed the metal tube filled with powder, the FSSS value of a powder is associated with the size of particle, meanwhile, it is of related to the strength of the agglomerates. For the as-reduced powders produced by the same sodium reduction process, the lower the FSSS value of the powder is, the larger the surface area is, but for the agglomerated powder, the powders having different surface area may be having similar FSSS value; and for the same capacitance grade powders, the particles with higher agglomeration degree have larger FSSS value. The laser particle size distribution results are derived from that the laser is diffracted and scattered by the sample particles and forms light intensity distribution patterns, depending on the particle size, i.e., outline of the porous or solid particles; and D10, D25, D50, D75 and D90 values are given. The corresponding values of D10, D25, D50, D75 and D90 respectively express the largest particle size of the particles accumulated from the least particle to total of 10 wt %, 25 wt %, 50 wt %, 75 wt % and 90 wt %. The D50 (median) is an indication of the general particle size of a powder. The scanning electron microscopy can be used to observe particle size from micrometer to millimeter, and the transmission electron microscopy can be used to observe nanometer particles.

The BET surface area of the as-reduced tantalum powder produced from sodium reducing $K_2TaF_7$ is in the range of 0.2~6.0 $m^2/g$. The average diameter of the primary particles of tantalum powder of 100000 $\mu F \cdot V/g$ grade is about 0.1 $\mu m$ (observed with SEM), the Scott bulk density of the powder is from about 0.4 $g/cm^3$ to about 0.6 $g/cm^3$. The BET surface area of the tantalum powder prepared by reducing $Ta_2O_5$ is in the range of from about 1 to about 20 $m^2/g$. The BET surface area of the niobium powder prepared by reducing $Nb_2O_5$ is in the range of from about I to about 30 $m^2/g$. The diameter of the primary particle of the powder is in the range of from about 10 to about 350 nm, and the Scott bulk density of the powder is in the range of from about 0.4 $g/cm^3$ to about 0.7 $g/cm^3$.

The tantalum or niobium powder for manufacturing electrolytic capacitors must be having good physical properties, such as suitable Scott bulk density and good flowability. The powder having no flowability is difficult to press into the pellet, and the pellets formed from the metal powders without good flowability have inconsistent weight, result in some troubles, such as large variations of capacitance of the capacitors, heterogeneous density of the pellets and difficult to be coated with the electrolyte and the cathode material, so that the tantalum powder is expected to have a flow rate more than 2.0 g/sec, and the niobium powder is expected to have a flow rate more than 1.0 g/sec.

However, the finer the powder is, the worse the flowability is, so that the fine particles prepared by sodium reduction process have to agglomerate into the porous particles having appropriate Scott bulk density and good flowability.

Moreover, the green pellets pressed from tantalum or niobium powder must be having enough strength. The anodes for electrolytic capacitors sintered from the pellets are expected to have large pore and appropriate distribution of pore size effective to impregnate with solution of manganese nitrate sufficiently, so that pyrolytic manganese dioxide can cover the dielectric tantalum oxide film completely to increase capacitance of the solid electrolytic capacitor, whereas too large pore is disadvantage to decrease the equivalent series resistance (ESR).

Efforts are always being made to improve the physical properties of tantalum powders and niobium powders. WO 99/61184 disclosed a method to agglomerate metal particles and metal particles having improved properties which method includes combining a volatilizable or vaporizable liquid with the particles to form wet particles; compacting the wet particles; drying the compacted wet particles to form a cake; and heat treating the cake to form agglomerated particles. Unfortunately, as the agglomerated particles are angular, the tantalum or niobium powder having CV higher than 80,000 $\mu FV/g$ made from this method has poor flowability.

Moreover, when vibrating the wet flaked particles (the primary particles are in flaky form, with a aspect ratio (diameter/thickness) 1~60), an intimate contact tends to form between the surfaces of overlapping flaked particles, thereby decrease the porosity and lower the crush strength of the pellets formed from the powder.

Chinese patent application No. 1238251A disclosed a method for producing agglomerated tantalum powder, but for the powder containing agglomerated particles having D50 more than 50 $\mu m$, the agglomerated powder has poor flowability, and can't meet the requirement of manufacture high performance electrolytic capacitors.

SUMMARY OF THE INVENTION

In order to solve these problems, the present inventors made research with great concentration and found that the finer the agglomerates are, the better sphericity the agglomerated particles are; and the powder has better flowability.

For overcoming the above problems, the present invention provides a method for spherically granulating and agglomerating metal particles. The method includes the steps of comminuting the particles to form fine particles having D50 less than 50 µm, then spherically granulating and thermal agglomerating the particles to obtain the agglomerated metal particles having good flowability.

As an embodiment of a method to agglomerate metal particles of the present invention, in a first aspect, the present method comprises the following steps:

a). comminuting the metal particles to form fine particles having D50 less than 50 µm:

b). granulating the comminuted metal particles comprising volatile liquid, for example, tantalum and/or niobium particles comprising volatile liquid, to form wet spherical particles;

c). still drying the wet spherical particles and removing volatile liquid to form flowable pre-agglomerated particles with increased bulk density;

d). heat treating the pre-agglomerated particles under vacuum;

e). screening the heat treated powder to obtain the flowable agglomerated particles.

In a second aspect, the present invention provides a flowable porous agglomerated metal particles, and especially tantalum and/or niobium particles having improved properties. Said agglomerated tantalum powder have a flow rate of at least about 2.0 g/sec, a BET surface area of from about 0.2 to about 6.0 m$^2$/g, a FSSS of at least 1.0 µm, a Scott bulk density of from about 1.2 g/cm$^3$ to about 5.5 g/cm$^3$. Said agglomerated niobium powder have a flow rate of at least about 1.0 g/sec, a BET surface area of from about 0.5 to about 8.0 m$^2$/g, a FSSS of at least 1.0 µm, a Scott bulk density of from about 0.7 g/cm$^3$ to about 3.5 g/cm$^3$. Said tantalum and/or niobium metal particles lead to improved pore size distribution of the sintered anodes and increased pellet crush strength.

In a third aspect, the present invention provides an electrolytic capacitor anodes made from the tantalum and/or niobium particles according to the present invention having a capacitance of from about 5,000 µFV/g to about 300,000 µFV/g.

DETAILED DESCRIPTION OF THE PRESENT INVENTION

Figure 1:
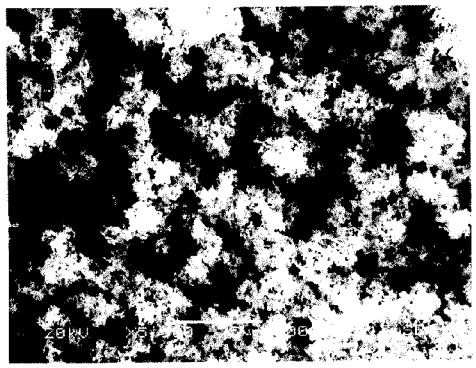
FIG. 1 is a scanning electron micrograph (SEM) of as-comminuted powder prepared according to the present invention example 1.

An embodiment of the present method comprising the steps as follows:

a). comminuting the metal particles to form fine particles having D50 less than 50 µm:

b). granulating the comminuted metal particles, for example, tantalum and/or niobium particles comprising volatile liquid to form wet spherical particles;

c). still drying the wet particles and removing volatile liquid to form flowable pre-agglomerated particles with increased bulk density;

d). heat treating the pre-agglomerated particles in vacuum;

e). screening the heat treated powder to obtain the flowable agglomerated particles.

For purpose of the present invention, the metal particles can be any type of metal particles, such as particles of metals, alloys, mixtures, and the like. Examples of the metal particles include, but are not limited to, tantalum, niobium, iron, cobalt, titanium, alloys containing any of the foregoing, and mixtures thereof. Preferably, the metal particles comprise powders of tantalum and/or niobium, or the metal powders comprising as main components tantalum and/or niobium. As for the term "tantalum and/or niobium powders" as used herein, it is intended to encompass a tantalum powder, a niobium powder, a powder of a mixture of tantalum and niobium, a powder of an alloy of tantalum and niobium, or the like.

According to the process of the present invention, the starting metal particles preferably are tantalum and/or niobium particles. The starting tantalum particles to be agglomerated by the method of the present invention have a BET surface area of at least about 0.3 m$^2$/g, preferably from about 0.5 m$^2$/g to about 20 m$^2$/g. The starting niobium particles to be agglomerated by the method of the present invention have a BET surface area of at least about 0.6 m$^2$/g, preferably from about 1.0 m$^2$/g to about 30 m$^2$/g. Said metal particles are porous particles. The shape of the metal particles is not limited and can be any shape, such as coral-like, grape-like agglomerates or angular, nodular, flaked, or any combination thereof.

According to the process of the present invention, said tantalum and/or niobium particles can be, but are not limited to, the tantalum and/or niobium metal powder produced from reducing $K_2TaF_7$ and/or $K_2NbF_7$ with sodium, from reducing tantalum and/or niobium oxides with reducing agent, e.g., magnesium, calcium, sodium, magnesium hydride, calcium hydride, etc., or from reducing the tantalum and/or niobium halides with reducing agent, e.g., hydrogen, sodium, potassium, etc.; the tantalum and/or niobium metal powder prepared from hydrogenating dense metal, such as ingot, and crushing or milling the hydrogenated metals.

According to the process of the present invention, said agglomerated tantalum and/or niobium particles can be high CV powder used for manufacturing low voltage (lower than 20 V) electrolytic capacitors or the flaked powder used for manufacturing middle, high voltage(20 V~100 V) electrolytic capacitors, or the tantalum and/or niobium powders obtained by hydrogenation process.

According to the process of the present invention, the step of comminuting the metal particles can be carried out by stirring at high speed (100 rpm~500 rpm) in water tank equipped with bafflers, or by ultrasonic vibrating to reduce the agglomerates size to obtain smaller particles; or by hydrogenating and crushing, or by milling to make the fine particles. Said comminuted metal particles have median diameter (D50) less than 50 µm, preferably less than 30 µm.

According to the process of the present invention, the comminuted metal particles, such as tantalum and/or niobium particles combined with volatile liquid are vibrated, tumbled and extruded to form wet spherical particles. The volatile liquid can be any liquid which is suitable for granulation. Examples of the volatile liquid include, but are not limited to, water, water-containing liquids, alcohols, aromatic-containing liquids and the mixture of them. Preferable volatile liquid is de-ionized water (DI water). In addition, additives can be added to the liquid at the desired proportions in order to fulfill certain purposes, e.g., to control the sintering shrinkage and to decrease the loss of surface area of the powders at high temperature, such as chemicals containing oxygen, nitrogen, phosphorus, or boron as sinter retarding agent. At least one selected from phosphorus and boron in an amount of from about 1 ppm to about 500 ppm based on the metals can be added.

According to the process of the present invention, said comminuted metal particles containing volatile liquid having increased coherent force between particles due to surface tension of liquids are subjected to granulation to form particles having uniform density. The amounts of the liquid as contained in the metal particles are from about 2 wt % to about 50 wt % of the weight of the metal particles such as tantalum and/or niobium particles, preferred from about 5 wt % to about 40 wt % of the weight of the particles.

According to the process of the present invention, said comminuted metal particles containing volatile liquid can be obtained by crushing the cake of reduction product and then subjecting the resultant to acid leaching and water washing. As example, fine particles having D50 less than 50 µm containing volatile liquid obtained by crushing the products which were obtained from the reaction of reducing double metal halides ($K_2TaF_7$, $K_2NbF_7$) with alkali metals; or from the reaction of reducing tantalum, niobium oxides with alkali or alkali earth metals and then subjecting the resultant to comminuting can be mentioned.

According to the process of the present invention, said comminuted metal particles containing volatile liquid can be obtained by a process comprising adding the volatile liquid into dry particles (essentially water-free) that have been comminuted with D50 less than 50 µm at least soaking for 5 minutes, preferably from about 20 minutes to about 300 minutes, to allow sufficient soak, then mixing the particles to form uniform particles containing volatile liquid. The mixing can be done in any manner which includes methods of simple mixing a solid with a liquid. For instance, manual stirring can be used as well as mechanism stirring, such as with stirrer or a blender.

According to the process of the present invention, said spherically granulating can be carried out by any method which can increase density of the particles containing volatile liquid and form spherical granules. For instance, the metal particles containing volatile liquid are put in a container, vibrated, tumbled or extruded to form wet spherical particles, especially by use of a granulator.

Moreover, the flaked metal particles can be subjected to granulation more than one time.

According to the process of the present invention, any means of drying the wet spherical granules can be used. For instance, the wet metal particles in container stand still at a sufficient temperature for a sufficient time to permit any volatile liquid to be removed from the wet metal particles. Preferably, drying in atmosphere or under flow air can be carried out at a temperature of from about 20° C. to about 100° C. for at least 24 hours, and vacuum drying can be carried out in a vacuum dryer at a temperature of between about 50° C.~300° C. for at least 16 hours.

The dried metal particles are flowable pre-agglomerated particles with increased density. The size of said pre-agglomerated particles is less than 1000 µm, preferably less than 500 µm.

According to the process of the present invention, the ratio of Scott bulk density of the pre-agglomerated particles to as-comminuted particles is greater than 1, preferably between 1~4, more preferably between 1.5~2.5.

According to the process of the present invention, once the pre-agglomerated particles are dried, the material is preferably heat treated. Before heat treatment, agents containing phosphorus, boron, such as $NH_4H_2PO_4$, $P_2O_5$, $(NH_4)_2HPO_4$, $NH_4PF_6$, $H_3PO_4$, $B_2O_3$, and $H_3BO_3$, can be added into the pre-agglomerated particles.

The heat treatment can be carried out in a similar manner to any other heat treatment for metal powders. For example, the pre-agglomerated particles can be transferred into tantalum or niobium tray and subsequently put the tray with pre-agglomerated particles into a vacuum heat treatment furnace to effect heat treatment, thereby the neighboring particles within each pre-agglomerated particle are sintered with each other to form agglomerated particles. The heat treatment is preferably at a temperature of from about 900° C. to about 1700° C. for 20~60 minutes for the metal particles comprising mainly tantalum; and at a temperature of from about 850° C. to about 1400° C. for 20~60 minutes for the metal particles comprising mainly niobium.

The agglomerated particles according to the process of the present invention would not be sintered considerably and only slight connections are formed between agglomerated particles, i.e., would not form a cake. The heat treated agglomerated particles according to the present invention process do not need crushing and can be directly subjected to screening, and the flowable agglomerated metal particles are obtained. The agglomerated particles usually are screened with 40 mesh~100 mesh screens.

According to the present invention process, if the agglomerated particles are desired to be partially deoxidized, the metal particles can be optionally mixed with less than 5 wt % reducing agent, such as Mg, Ca, Al and heated at a temperature of from about 700° C. to about 1100° C. in vacuum or an inert atmosphere and then acid leached and water washed, as is well known to those skills in the art.

According to the present invention process, the agglomerated particles are optionally added with nitrogen during the process of sodium reduction, heat treatment or deoxidization, to give a nitrogen content of 0.005 wt %~10 wt % in the agglomerated metal particles especially tantalum and/or niobium particles.

A combination of properties can be achieved with the metal particles by the present invention. The flowable spherical porous agglomerated tantalum and/or niobium particles obtained by the present invention process have a D50 of from about 60 μm to 200 μm. In particular, the tantalum powders comprising 0.12 wt %~3 wt % of oxygen and 0.005 wt %~10 wt % of nitrogen, have a flow rate at least of 2.0 g/sec, preferably from about 2.0 g/sec to about 6.0 g/sec, and more preferably 4.0 g/sec to about 6.0 g/sec; a FSSS of at least 1.0 μm; a BET surface area of from about 0.2 $m^2/g$ to about 6.0 $m^2/g$, preferably from about 0.8 $m^2/g$ to about 3.5 $m^2/g$; a Scott bulk density of from about 1.2 $g/cm^3$ to about 5.5 $g/cm^3$, preferably from 1.4 $g/cm^3$ to 2.2 $g/cm^3$; the niobium powders comprising 0.3 wt %~14 wt % of oxygen and 0.01 wt %~10 wt % of nitrogen, have a flow rate of at least 1.0 g/sec, preferably from about 1.0 g/sec to about 4.0 g/sec, and more preferably from about 2.5 g/sec to about 4.0 g/sec; a FSSS of at least 0.8 μm; a BET surface area of from about 0.5 $m^2/g$ to about 8.0 $m^2/g$, preferably from about 1.0 $m^2/g$ to about 4.5 $m^2/g$; a Scott bulk density of from about 0.7 $g/cm^3$ to about 3.5 $g/cm^3$, preferably from 1.0 $g/cm^3$ to 1.6 $g/cm^3$.

The pellets pressed from the agglomerated metal particles of the present invention have higher green pellet crush strength than from conventional metal particles. The anodes sintered from the agglomerated metal particles of the present invention have improved pore size distribution, less fine pores of less than 0.2 μm, more pores of 0.2 μm~0.6 μm than from conventional metal particles.

The tantalum and/or niobium powder produced by the present invention process can be made into electrolytic capacitor anodes by pressing the powder in the pellets, subsequently sintering into sintered bodies, then anodizing them in an electrolytic solution to form an electrolytic anode having a film of oxides over the surface of the sintered bodies. The anodes made from the agglomerated tantalum powder of the present invention have a capacitance of from about 5,000 μFV/g to about 250,000 μFV/g; the anodes made from the agglomerated niobium powder of the present invention have a capacitance of from about 10,000 μFV/g to about 300,000 μFV/g.

The data disclosed in the present specification were measured as follows: the flowability of the metal powder was tested by referencing to the Chinese national standard GB 1482-84, the flow rate was measured by taking the average value from the results of three repeating tests which in each test the weight of 50(g) was divided by the time (minute) for 50 g metal powder to flow through a standard funnel having a hole with a diameter of 5 mm; no flowability indicates that the powder did not flow through the funnel; the Scott bulk density (SBD) of the powder was measured in accordance with the process of the Chinese national standard GB 5060-85; the FSSS of the powder was measured in accordance with the process of the Chinese national standard GB 3249-82; the BET surface area of the powder was measured in accordance with the BET nitrogen adsorption process with a surface area analyzer ASAP2021 available from Micromerities Corporation; the medium particle size (D50) of the powder as well as the distribution of the particle size of the powder were measured with a LS-230 laser particle size distribution analyzer available from BECKMAN COULTER Corporation after a ultra-sonic wave vibration of 60 seconds; the screening results were derived by referencing to the process of ASTM-B-214-86; the SEM photographs were taken with JSM-5610LV scan electronic microscope; the pore size distributions of the powder were tested by Autopore III available from Micromerities Corporation.

It is to be understand that the following description of preferred embodiments by way of examples in conjunction with accompanying drawings are provided only further to illustrative the features and the advantages of the present invention and not limit the scope of the appended claims.

EXAMPLES

Example 1

A powder obtained from the reduction process of potassium fluorotantalate with liquid sodium was used as starting material (material 1). The data of BET surface area, Scott bulk density, FSSS and particle size distribution of the powder were listed in table 1. The tantalum powder was comminuted in a water tank equipped with bafflers by rotating at about 300 rpm to form comminuted particles. The data of BET surface area, Scott bulk density, FSSS and particle size distribution of said comminuted powder were shown in table 2, and a micrograph of the powder was shown in FIG. 1.

Figure 2:
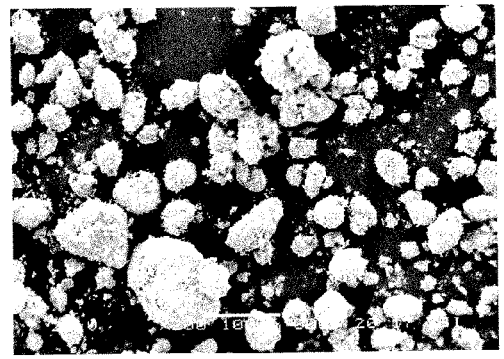
FIG. 2 is a SEM photograph of discrete spherical pre-agglomerated particles according to the present invention example 1.

An amount of ten kilograms of said comminuted tantalum powder was put in a pan, sprinkled with a solution of 3500 ml of DI water including dissolved 2.1 grams of $NH_4H_2PO_4$ and soaked for 10 minutes. The soaked tantalum powder was manually stirred to permit uniform absorption of the liquid into the pores of the tantalum particles, subsequently spherically granulated in a granulator. The wet granulated particles were dried in a vacuum dryer at about 90° C. for about 24 hours to form flowable pre-agglomerated particles with a size of less than 1000 μm. A micrograph of the pre-agglomerated particles was shown in FIG. 2. The SBD and flow rate of the particles were shown in table 3.

The dried pre-agglomerated tantalum particles were then transferred into tantalum trays, and the trays containing the particles were put into a vacuum heat treatment furnace to be heated at about 1200° C. at a vacuum level of less than 1.33 Pa for 30 minutes. After heat treatment, the loose agglomerated particles were screened with an 80 mesh screen. The −80 mesh portions of the agglomerated particles were deoxidized with magnesium; acid leached, dried and screened to obtain the agglomerated tantalum particles. The micrograph of the agglomerated tantalum particles was shown in FIG. 3. The data of flow rate, FSSS, Scott bulk density, BET surface area, particle size distribution, screen analysis and the contents of O, N of the agglomerated tantalum particles were listed in table 4.

Figure 5:
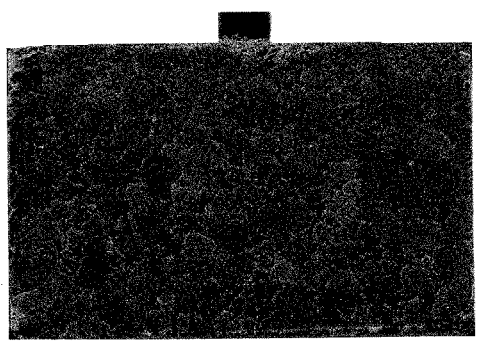
FIG. 5 is a SEM photograph of a surface of an anode sintered from the tantalum powder according to the present invention example 1.

The above tantalum powder was pressed into pellets each of which had a weight of about 170 mg of powder, a size of 4.7 mm×3.3 mm×2.2 mm and a density of 5.0 $g/cm^3$. The pellets were sintered in a vacuum furnace at about 1300° C. for 20 minutes to form sintered pellets. A SEM photograph of the sintered pellets was shown in FIG. 5. The pore size distribution of the sintered pellets was shown in FIG. 12.

The above sintered pellets were anodized in a phosphorous acid solution of 0.1 vol % at about 85° C. at 30 V held for about 2 hours to form electrolytic capacitor anodes. The data of capacitance and DC leakage of the electrolytic capacitor anodes were tested and listed in table 4.

Comparative Example 1

An amount of ten kilograms of the comminuted tantalum powder material 1 used in sample 1 was put in a pan, sprinkled with a solution of 3500 ml of DI water comprising dissolved 2.1 grams of $NH_4H_2PO_4$ and soaked for 2 hours. The soaked tantalum powder was transferred into tantalum trays, subsequently added with additional 300 ml DI water and the trays fitted on a table were vibrated to compact the wet particles. Then the wet particles were dried in a vacuum dryer at about 90° C. for about 24 hours to form cakes. The cakes had an apparent density of 2.3 g/cc. The tantalum trays containing the dried tantalum cakes were then transferred into a vacuum heat treatment furnace to be heated as described in sample 1. The heat treated cakes were crushed and pulverized to form fine powder. The powder was deoxidized as described in sample 1 and the data of flow rate, FSSS, Scott bulk density, BET surface area, particle size distribution, screen analysis and the contents of O, N of the powder were shown in table 4. A micrograph of the powder was shown in FIG. 4.

Figure 6:
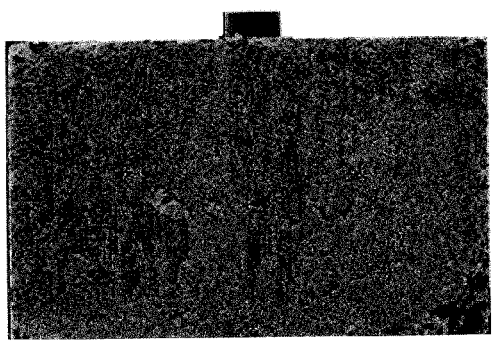
FIG. 6 is a SEM photograph of a surface of an anode sintered from the tantalum powder of comparative example 1.

The above tantalum powder was processed into sintered pellets as described in example 1. The SEM photograph of the sintered pellets was shown in FIG. 6. The pore size distribution of the sintered pellets was shown in FIG. 12.

The sintered pellets were anodized as described in sample 1. The data of CV and DC leakage were shown in table 4.

Figure 3:
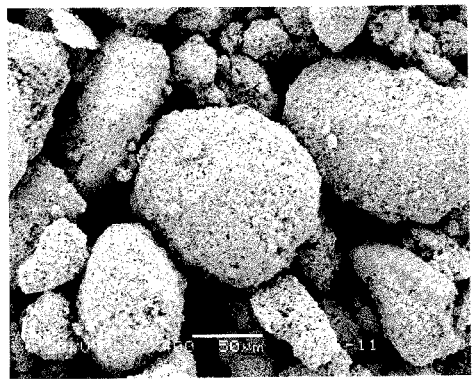
FIG. 3 is a SEM photograph of heat treated and deoxidized particles according to the present invention example 1.
Figure 4:
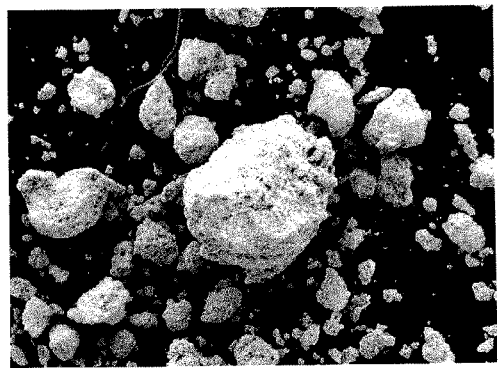
FIG. 4 is a SEM photograph of the tantalum powder of comparative example 1.

Comparing FIG. 3 with FIG. 4, it could be seen that the agglomerated particles according to the process of the present invention (FIG. 3) comprised approximately spherical particles, but the particles of comparative example 1 (FIG. 4) were polygonal. Comparing FIG. 5 with FIG. 6, it could be seen that the sintered pellets according to the process of the present invention (FIG. 5) have uniform pores, and the large pores among the spherical particles were in favor of impregnation of the solution of manganese nitrate; and the sintered pellets made from the comparative example 1 powder (FIG. 6) were short of edges and comers and some pores were blocked up. The data in table 4 showed that the particle size distribution of example 1 according to the process of the present invention had more advantage, had less +80 mesh coarse particles and less −325 mesh fine particles than the comparative example 1, and the flowability of the former was better than the later.

Figure 12:
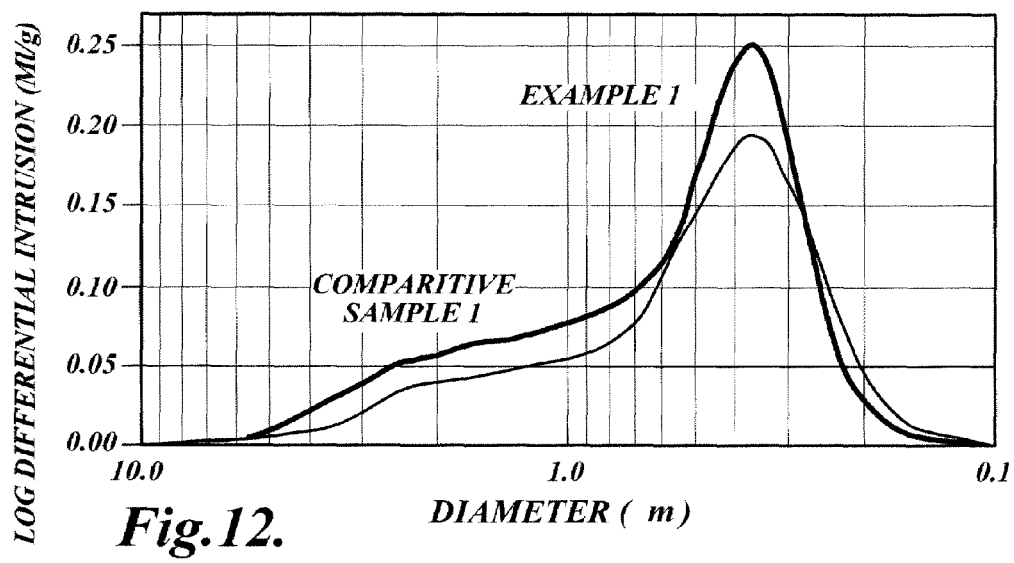
FIG. 12 shows the pore size distributions of the present example 1 and comparative example 1.

It could be seen from FIG. 12 that the pore size distribution of the tantalum sintered anode made from the powder according to the present invention process (example 1) had more centralized in pores of 0.2~0.6 μm, and less pores of less than 0.2 μm and larger than 1.0 μm than the comparative example 1, which was in favor of impregnation of the electrolytic and cathode materials and in favor of reducing ESR.

Example 2

Figure 13:
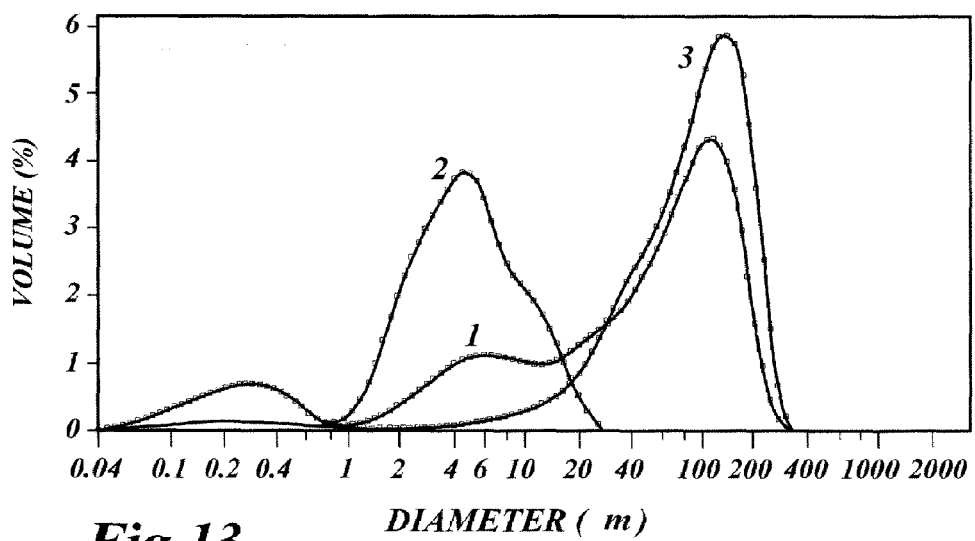
FIG. 13 shows the particle size distributions of the starting powder (curve 1), the as-comminuted powder (curve 2) and agglomerated powder (curve 3) according to the present invention example 2.

A tantalum powder obtained from the reduction process of potassium fluorotantalate with liquid sodium was used as starting material (material 2). The data of BET surface area, Scott bulk density, FSSS and particle size distribution of the material 2 were listed in table 1. The particle size distribution of the material 2 tantalum powder was shown as curve 1 in FIG. 13. The tantalum powder was comminuted in a water tank equipped with bafflers by rotating at about 300 rpm to form comminuted particles. The data of BET surface area, Scott bulk density, FSSS and particle size distribution of said comminuted powder were shown in table 2. The particle size distribution of the comminuted particles was shown as curve 2 in FIG. 13.

An amount of ten kilograms of the said comminuted tantalum powder was put in a pan, sprinkled with a solution of 3500 ml DI water comprising 5.3 grams of dissolved $NH_4H_2PO_4$ and soaked for 60 minutes. The soaked tantalum powder was granulated as example 1. The wet granulated particles were dried in a vacuum dryer at about 80° C. for about 24 hours to formed flowable pre-agglomerated particles with a size of less than 1000 μm. The SBD and flow rate of the pre-agglomerated particles were shown in table 3.

Figure 7A:
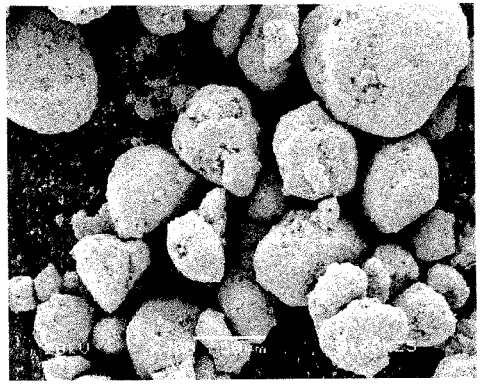
FIGS. 7a, 7b are SEM photographs with different magnifications of heat treated and deoxidized particles according to the present invention example 2.
Figure 7B:
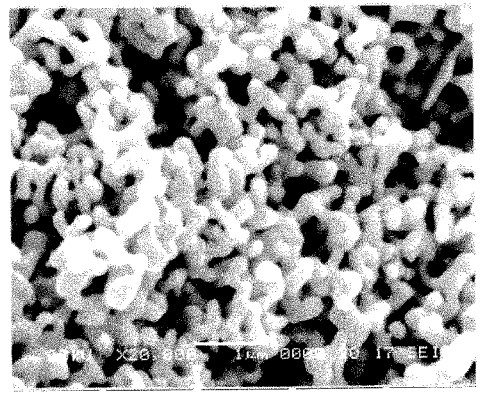

Then the dried pre-agglomerated tantalum particles were transferred into tantalum trays. The trays containing the particles were put into a vacuum heat treatment furnace to be heated at about 1050° C. at a vacuum level of less than 1.33 Pa for 30 minutes to form agglomerated particles. The deoxidization of the agglomerated powder was conducted as described in sample 1. The data of flow rate, FSSS, Scott bulk density, BET surface area, particle size distribution, screen analysis and the contents of O, N of the agglomerated tantalum particles were listed in table 4. The micrographs of the agglomerated tantalum particles of different magnifications were shown in FIGS. 7a and 7b. The particle size distribution of the agglomerated particles was shown as curve 3 in FIG. 13.

The above tantalum powder was pressed into pellets each of which had a weight of about 100 mg of powder, a size of a diameter of about 3.00 mm and a height of about 2.83 mm, a density of about 5.0 g/cm$^3$. The pellets were sintered in a vacuum furnace at about 1200° C. for 20 minutes to form sintered pellets. The above sintered pellets were anodized in 0.1 vol % phosphorous acid solution at about 80° C. at 20 V held for about 2 hours to form electrolytic capacitor anodes. The data of capacitance and DC leakage of the electrolytic capacitor anodes were tested and listed in table 4.

Comparative Example 2

The properties of (material 2) tantalum powder in example 2 which was used as starting material were listed in table 1. An amount of ten kilograms of the above starting tantalum powder in un-comminuted state was granulated to form pre-agglomerated particles. The pre-agglomerated particles had no flowability, and the SBD of the particles was shown in table 3. The pre-agglomerated particles were heat treated and deoxidized as described in example 2. The data of flow rate, FSSS, Scott bulk density, BET surface area, particle size distribution, screen analysis and the contents of O, N of the tantalum powder obtained as described above were shown in table 4.

The electrolytic capacitor anodes were prepared from the above tantalum powder as described in example 2, and the data of CV and DC leakage of the powder was shown in table 4.

Comparing the results of the pre-agglomerated particles of example 2 with comparative example 2 in table 2, the former had flowability, but the latter had no flowability. The agglomerated tantalum powder according to the present invention had better flowability than the tantalum powder prepared according to the comparative example 2, as could be seen from table 4.

Example 3

Figure 8A:
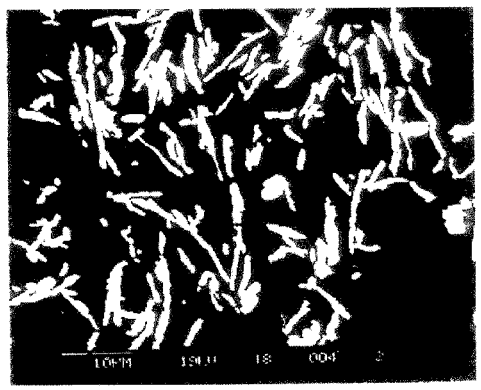
FIG. 8a is a SEM photograph of a cross section of flaked tantalum powder, and 8b and 8c are SEM photographs of heat treated and deoxidized particles according to the present invention example 3.

The material powder 3 in table 1 was used as starting material. The powder 3 was milled, washed and dried to obtain flaked tantalum particles which had the values of BET surface area, SBD, FSSS and particle size distribution listed in table 2. It was fond that the surface area of the flaked tantalum powder increased considerably. FIG. 8a is a SEM micrograph of the cross section of the flaked particles having an average flakiness (aspect ratios (D/T)) of 8.6.

An amount of ten kilograms of the milled particles was soaked with 600 ml of DI water for 30 minutes and stirred with a stirrer, subsequently spherically granulated with a granulator. The wet granulated particles were dried in a vacuum dryer at about 10° C. for about 24 hours. The dried pre-agglomerated tantalum particles were then transferred into tantalum trays, and the trays containing the particles were put into a vacuum heat treatment furnace to be heated at about 1300° C. at a vacuum level of less than 1.33 Pa for 30 minutes. The first agglomerated flaked tantalum particles were obtained by screening said heat treated material with a 100 mesh screen. The −100 mesh portion of said agglomerated particles was then soaked with 2200 ml DI water for 30 minutes and stirred with a stirrer, subsequently granulated again in a granulator. The wet granulated particles were dried in a vacuum dryer at about 100° C. for about 24 hours to form flowable pre-agglomerated particles with a size of less than 1000 μm, the SBD and flow rate of which were shown in table 3.

The dried pre-agglomerated tantalum particles were then transferred into tantalum trays, and the trays containing the particles were put into a vacuum heat treatment furnace to be heated at about 1460° C. at a vacuum level of less than 1.33 Pa for 40 minutes. After heat treatment, the loose agglomerated particles were screened with 80 mesh screen. The −80 mesh portion of the agglomerated particles was deoxidized with magnesium, acid leached and dried to provide the second agglomerated flaked tantalum particles. The SEM photographs of the second agglomerated flaked tantalum particles were shown in different magnifications in FIGS. 8b and 8c. The data of flow rate, FSSS, Scott bulk density, BET surface area, particle size distribution, screen analysis and the contents of O, N of the second agglomerated flaked tantalum particles were listed in table 4.

The above second agglomerated flaked tantalum powder was pressed with a cylinder mould with a inner diameter of 4.1 mm into pellets each of which had a weight of about 300 mg of powder, and had different density of 5.0 g/cm$^3$, 5.5 g/cm$^3$, 6.0 g/cm$^3$ and 6.5 g/cm$^3$. These green pellets were tested with a RGD-05 crush strength pressure machine (the force when the pellet was crushed, measured in Newton), and the test results were shown in FIG. 14.

The above second agglomerated flaked tantalum powder was pressed into pellets each of which had a weight of 150 mg, a size of about 3 mm in diameter and about 4.25 mm in height, a density of 5.0 g/cm3. The pellets were sintered in a vacuum furnace at a temperature of about 1500° C. for 30 minutes to form sintered pellets. The sintered pellets were anodized in a 0.1 vol % phosphorous acid solution at 80° C. at 140 V held for 2 hours to form electrolytic capacitor anodes. The data of capacitance and DC leakage of the electrolytic capacitor anodes were measured and listed in table 4.

Comparative Example 3

An amount of ten kilograms of the as-milled flaked tantalum powder of example 3 was heat treated at about 1300° C. for 30 minutes to form a cake. The heat treated cake was crushed and screened with a 100 mesh screen to provide the first heat treated tantalum powder. The first heat treated tantalum powder was then put in tantalum trays, added with 3600 ml DI water and soaked for 6 hours, then the trays fitted on a table were vibrated to compact the wet particles. Then the wet particles were dried in a vacuum dryer at about 100° C. for about 24 hours to form cakes. The trays containing the tantalum particle cakes were heat treated as described in example 3. The heat treated tantalum cakes were crushed and screened with an 80 mesh to give −80 mesh powders and deoxidized as described in example 3. A micrograph of the tantalum particles prepared above was shown in FIG. 9. The data of flow rate, FSSS, Scott bulk density, BET surface area, particle size distribution, screen analysis and the contents of O, N of the tantalum particles were listed in table 4.

Figure 14:
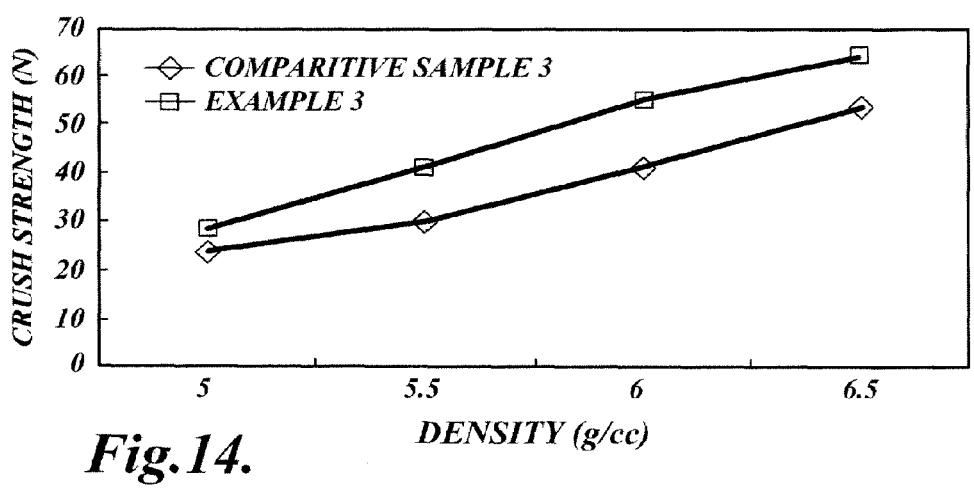
FIG. 14 shows the crush strength of the green pellets according to example 3 of the present invention and comparative example 3.

The crush strength of the green pellets pressed from said tantalum powder was tested as described in example 3; the results are shown in FIG. 14. In the range of density of 5.0 g/cm$^3$~6.5 g/cm$^3$ of the pellets pressed from agglomerated particles prepared according to the present invention have higher crush strength than the pellets obtained according to comparative example 3.

The electric properties of CV and DC leakage of the powder were tested as described in example 3, and the results are shown in table 4.

Figure 8B:
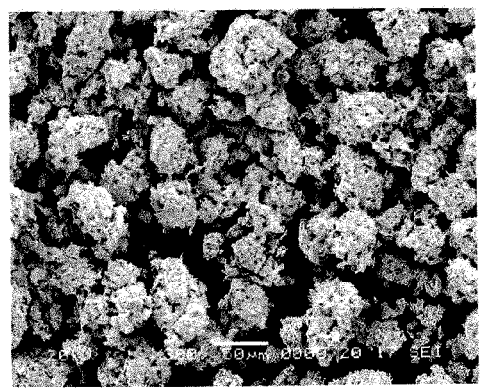
Figure 8C:
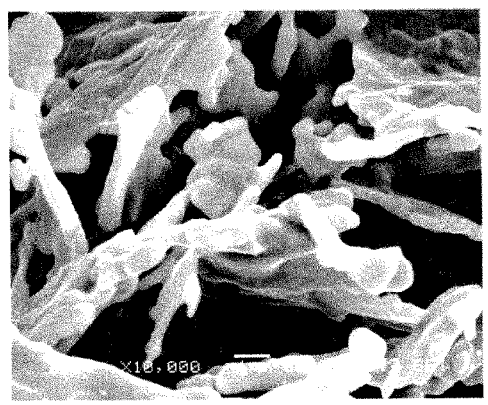
Figure 9:
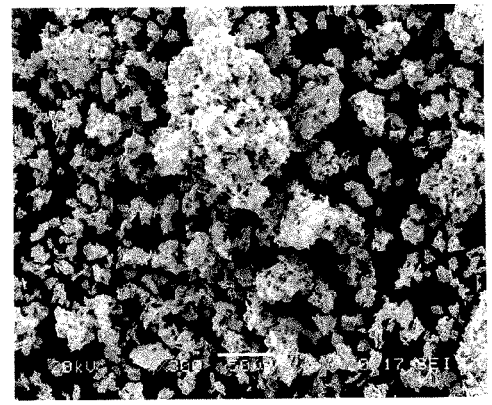
FIG. 9 is a SEM photograph of the tantalum powder of comparative example 3.

Comparing FIG. 8b with FIG. 9, it could be seen that agglomerated particles according to the present invention in FIG. 8b comprised particles with better sphericity and greater homogeneity than the particles according to comparative example 3 in FIG. 9. The agglomerated particles prepared according to the present invention process (example 3) have less +80 mesh coarse particles and less −325 mesh fine particles, and had higher flow rate than the powder prepared according to comparative example 3 as could be seen from the data in table 4.

Example 4

The data of BET surface area, Scott bulk density, FSSS and particle size distribution of the niobium powder (material 4) obtained from the reduction of $Nb_2O_5$ with magnesium were listed in table 1. The niobium powder was comminuted in a water tank equipped with bafflers by stirring at about 400 rpm. The data of BET surface area, Scott bulk density, FSSS and particle size distribution of said comminuted powder were shown in table 2.

An amount of ten kilograms of said comminuted niobium particles was transferred in pans, sprinkled with a solution of 3500 ml DI water comprising 500 mg of dissolved $NH4H_2PO_4$ and soaked for 30 minutes. The soaked niobium powder was manually stirred to permit uniform absorption of the liquid into the pores of the niobium particles, subsequently spherically granulated in a granulator. The wet granulated particles were dried in a vacuum dryer at about 90° C. for about 24 hours to form flowable pre-agglomerated particles with a size of less than 1000 μm. The SBD and flow rate of the pre-agglomerated particles were shown in table 3.

Figure 10:
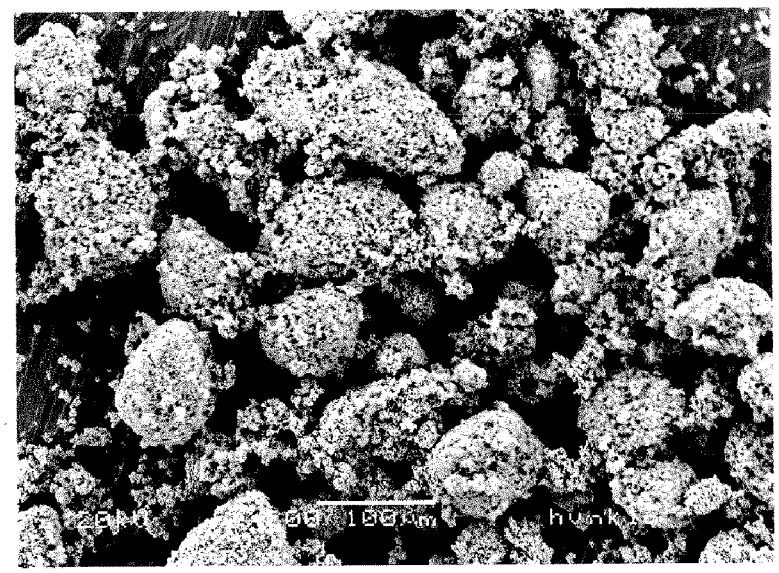
FIG. 10 is a SEM photograph of the niobium powder according to the present invention example 4.

The dried pre-agglomerated niobium particles were then transferred into niobium trays, and the trays containing the particles were put into a vacuum heat treatment furnace to be heated at about 1040° C. at a vacuum level of less than 1.33 Pa for 30 minutes. After heat treatment, the loose agglomerated particles were screened with 80 mesh screen. The −80 mesh portion of the agglomerated particles was deoxidized with magnesium, acid leached and dried. A micrograph of the resulted agglomerated niobium particles was shown in FIG. 10. The data of flow rate, FSSS, Scott bulk density, BET surface area, particle size distribution, screen analysis and the contents of O, N of the resulted agglomerated niobium particles were listed in table 4.

The above niobium powder was pressed into pellets each of which had a weight of about 80 mg of powder, a size of 3.0 mm in diameter and 3.8 mm in height, and a density of about 3.0 g/cm$^3$. The pellets were sintered in a vacuum furnace at about 1150° C. for 20 minutes to form sintered pellets.

The sintered pellets were anodized at in a 0.1 vol % phosphorous acid solution at about 80° C. at 30 V held for about 4 hours to form electrolytic capacitor anodes. The data of capacitance and DC leakage of the electrolytic capacitor anodes were measured and listed in table 4.

Example 5

The data of BET surface area, Scott bulk density, FSSS and particle size distribution of the tantalum powder (material 5) produced from reduction $Ta_2O_5$ with sodium and $CaCl_2$ were listed in table 1. The tantalum powder was comminuted in a water tank equipped with bafflers by stirring at a 200 rpm, and the tantalum-containing slurry was added with ethanol (ratio of ethanol to water is about 1:1, w/w). The slurry was filtrated with centrifugal machine to form a cake containing ethanol-water solution until the ratio (in weight) of tantalum particles to ethanol-water solution was about 1:0.10~0.25 (as measured with a fast water content tester and a sample of which exhibited properties as shown in table 2), and subsequently transferred the cake to granulate in a granulator to form wet agglomerated particles. The wet granulated particles were dried in a vacuum dryer at about 60° C. for about 24 hours to form flowable pre-agglomerated particles with a size of less than 1000 μm. The data of Scott bulk density and flow rate of the pre-agglomerated particles were shown in table 3.

Figure 11:
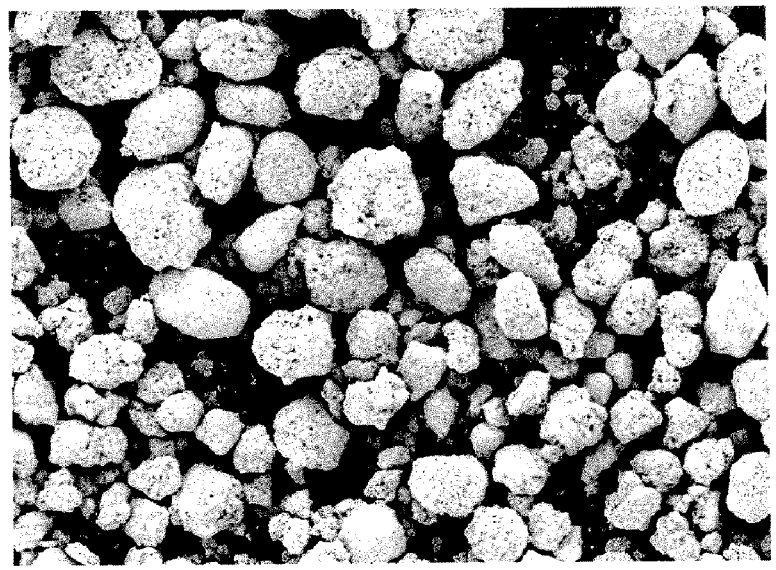
FIG. 11 is a SEM photograph of agglomerated particles according to the present invention example 5.

The dried pre-agglomerated tantalum powder was then doped with ammonium hexa fluoro phosphate ($NH_4PF_6$) as phosphorous source to provide a phosphorous content of about 120 ppm by weight in the powder. The doped powder was transferred into tantalum trays. The trays containing the particles were put into a vacuum heat treatment furnace to be heated at about 1060° C. at a vacuum level of less than 1.33 Pa for 30 minutes. After heat treatment, the loose agglomerated particles were screened with an 80 mesh screen. The −80 mesh portions of the agglomerated particles were deoxidized with magnesium, acid leached and dried, and the data of flow rate, FSSS, Scott bulk density, BET surface area, particle size distribution, screen analysis and the contents of O, N of the agglomerated tantalum particles were measured and listed in table 4. A SEM photograph of the agglomerated tantalum particles was shown in FIG. 11.

The above tantalum powder was pressed into rectangular pellets each of which had a weight of about 40 mg of powder, a size of 2.62 mm×2.22 mm×1.45 mm and a density of 4.74 g/cm³. The pellets were sintered in a vacuum furnace at about 1200° C. for 20 minutes to form sintered pellets. The sintered pellets said above were anodized in a 0.01 vol % phosphorous acid solution at about 60° C. at 16 V held for about 2 hours to form electrolytic capacitor anodes. The data of capacitance and DC leakage of the electrolytic capacitor anodes were measured and listed in table 4.

Example 6

The data of BET surface area, Scott bulk density, FSSS and particle size distribution of the tantalum powder (material 6) obtained from the reduction of potassium fluorotantalate with liquid sodium were listed in table 1. The tantalum powder was comminuted in a water tank by an ultrasonic shock, and then filtered and dried. The data of BET surface area, Scott bulk density, FSSS and particle size distribution of said comminuted powder were shown in table 2. A sample of 500 gram comminuted tantalum particles was transferred in a pan, added with a solution of 180 ml D.I. water containing 350 mg dissolved $NH_4H_2PO_4$ and soaked for 60 minutes, manually stirred and then granulated in a granulator to form wet agglomerated particles. The wet granulated particles were dried in a vacuum dryer at about 60° C. for about 24 hours to form flowable pre-agglomerated particles with a size of less than 1000 μm, and the SBD and flow rate of which were shown in table 3.

The dried pre-agglomerated tantalum particles were then transferred into tantalum trays. The trays containing the particles were put into a vacuum heat treatment furnace to be heated at about 1050° C. at a vacuum level of less than 1.33 Pa for 30 minutes to form agglomerated particles. The heat treated powder was screened with 100 mesh screen. The −100 mesh powder was deoxidized with magnesium and doped with nitrogen, followed with acid leaching, drying to obtain a resulted powder. The data of flow rate, FSSS, Scott bulk density, BET surface area, particle size distribution, screen analysis and the contents of O, N of the resulted powder were listed in table 4.

The above tantalum powder was pressed into pellets each of which had a weight of about 100 mg, a size of about 3.00 mm in diameter and about 2.83 mm in height, a density of about 5.0 g/cm³. The pellets were sintered in a vacuum furnace at about 1250° C. for 20 minutes to form sintered pellets. The sintered pellets were anodized in a 0.1 vol % phosphorous acid solution at about 80° C. at 10 V held for about 2 hours to form electrolytic capacitor anodes. The data of capacitance and DC leakage of the electrolytic capacitor anodes were measured and listed in table 4.

TABLE 1

| | Properties of Material Particles | | | | | |
|---|---|---|---|---|---|---|
| | material1/ Na red. Ta powder | material2/ Na red. Ta powder | material3/ Na red. Ta powder | material4/ Na red. Nb powder | material5/ Ta powder (red. $Ta_2O_5$) | material6/ Na red. Ta powder |
| FSSS (μm) | 0.38 | 0.27 | 2.51 | 0.54 | 0.26 | 0.23 |
| SBD (g/cm³) | 0.51 | 0.57 | 1.68 | 0.46 | 0.54 | 0.60 |
| BET (m²/g) | 1.80 | 3.30 | 0.60 | 1.88 | 6.80 | 5.10 |
| flow rate (g/sec) | no | no | no | no | no | no |
| | particle size distribution (μm) | | | | | |
| D10 | 4.929 | 3.340 | 25.81 | 4.730 | 2.382 | 2.730 |
| D25 | 17.36 | 10.43 | 53.55 | 11.28 | 11.23 | 11.28 |
| D50 | 65.23 | 59.53 | 108.0 | 51.12 | 50.52 | 51.53 |
| D75 | 109.5 | 98.99 | 155.5 | 105.9 | 105.9 | 78.99 |
| D90 | 151.2 | 149.6 | 205.4 | 163.0 | 163.2 | 109.6 |

TABLE 2

Properties of as-Comminuted Metal Particles

| | example 1 | comp. 1 | example 2 | comp. 2 | example 3 | comp. 3 | example 4 | example 5 | example 6 |
|---|---|---|---|---|---|---|---|---|---|
| FSSS (μm) | 0.36 | 0.36 | 0.26 | 0.27 | 0.35 | 0.35 | 0.52 | 0.2 | 0.23 |
| SBD (g/cm$^3$) | 0.50 | 0.50 | 0.55 | 0.57 | 0.72 | 0.72 | 0.48 | 0.56 | 0.61 |
| BET (m$^2$/g) | 1.96 | 1.96 | 3.52 | 3.30 | 0.88 | 0.88 | 2.01 | 7.7 | 5.20 |
| particle size distribution (μm) | | | | | | | | | |
| D10 | 1.154 | 1.154 | 1.074 | 3.34 | 2.731 | 2.731 | 2.871 | 1.353 | 1.112 |
| D25 | 3.283 | 3.283 | 2.916 | 10.43 | 7.580 | 7.580 | 5.183 | 2.030 | 2.135 |
| D50 | 19.68 | 19.68 | 7.803 | 59.53 | 25.36 | 25.36 | 19.22 | 3.309 | 6.520 |
| D75 | 70.23 | 70.23 | 23.42 | 98.99 | 78.59 | 78.59 | 59.23 | 6.344 | 21.10 |
| D90 | 103.3 | 103.3 | 53.78 | 149.6 | 114.9 | 114.9 | 102.7 | 15.11 | 62.30 |

TABLE 3

Properties of Pre-Agglomerated Particles

| | example 1 | comp. 1 | example 2 | comp. 2 | example 3 | comp. 3 | example 4 | example 5 | example 6 |
|---|---|---|---|---|---|---|---|---|---|
| SBD (g/cm$^3$) | 1.28 | 2.3 (cake) | 1.15 | 0.98 | 1.31 | 2.2 (cake) | 0.72 | 1.31 | 1.12 |
| flow rate (g/sec) | 2.50 | no | 2.0 | no | 3.12 | no | 2.1 | 2.78 | 2.0 |

TABLE 4

Properties of Agglomerated Particles

| | example 1 | comp. 1 | example 2 | comp. 2 | example 3 | comp. 3 | example 4 | example 5 | example 6 |
|---|---|---|---|---|---|---|---|---|---|
| FSSS (μm) | 2.8 | 3.0 | 1.52 | 1.02 | 2.88 | 2.91 | 2.86 | 1.2 | 1.1 |
| SBD (g/cm$^3$) | 1.78 | 1.80 | 1.45 | 1.30 | 1.81 | 1.80 | 1.02 | 1.75 | 1.62 |
| BET (m$^2$/g) | 1.68 | 1.65 | 2.56 | 2.57 | 0.62 | 0.61 | 2.05 | 3.5 | 4.5 |
| particle size distribution (μm) | | | | | | | | | |
| D10 | 28.72 | 15.22 | 34.52 | 17.96 | 6.88 | 7.02 | 20.56 | 3.623 | 5.231 |
| D25 | 55.85 | 35.81 | 60.03 | 39.21 | 35.47 | 32.51 | 60.69 | 11.38 | 12.56 |
| D50 | 104.4 | 75.02 | 105.5 | 82.58 | 93.54 | 100.2 | 119.5 | 63.91 | 70.62 |
| D75 | 159.4 | 162.4 | 163.3 | 134.6 | 190.5 | 196.3 | 192.2 | 158.6 | 182.3 |
| D90 | 208.2 | 270.3 | 216.1 | 181.3 | 268.1 | 286.1 | 256.0 | 202.0 | 210.5 |
| screens (%) | | | | | | | | | |
| −60/+80 | 0.8 | 3.6 | 3.0 | 3.5 | 1.8 | 2.5 | 0.6 | 2.0 | 1.3 |
| −80/+200 | 52.6 | 35.4 | 60.2 | 40.6 | 37.6 | 28.6 | 42.1 | 60.2 | 65.0 |
| −200/+325 | 24.3 | 23.6 | 19.1 | 19.6 | 23.5 | 14.2 | 18.5 | 21.5 | 23.5 |
| −325/+400 | 12.5 | 13.5 | 11.5 | 14.5 | 12.5 | 16.8 | 12.6 | 10.6 | 7.0 |
| −400 | 9.8 | 23.9 | 6.2 | 21.8 | 24.6 | 37.9 | 26.2 | 5.7 | 3.2 |
| flow rate (g/sec) | 3.85 | 1.78 | 3.33 | 1.37 | 4.16 | 1.92 | 2.78 | 4.17 | 2.50 |
| O (%) | 0.50 | 0.51 | 0.860 | 0.850 | 0.212 | 0.220 | 0.630 | 0.950 | 0.800 |
| N (%) | 0.07 | 0.07 | 0.32 | 0.30 | 0.021 | 0.022 | 0.03 | 0.25 | 8.10 |
| Electrolytic capacitor anodes | | | | | | | | | |
| weight (mg) | 170 | 170 | 100 | 100 | 150 | 150 | 80 | 40 | 100 |
| pellet density (g/cm$^3$) | 5.0 | 5.0 | 5.0 | 5.0 | 5.0 | 5.0 | 3.0 | 4.74 | 5.0 |
| Sintered temp. (° C.) | 1300 | 1300 | 1200 | 1200 | 1500 | 1500 | 1150 | 1200 | 1250 |
| sintered time (min) | 20 | 20 | 20 | 20 | 30 | 30 | 20 | 20 | 20 |
| sintered density (g/cm$^3$) | 5.40 | 5.41 | 5.10 | 5.12 | 5.46 | 5.50 | 3.10 | 4.89 | 5.10 |
| Formation temp. (° C.) | 85 | 85 | 80 | 80 | 80 | 80 | 80 | 60 | 80 |
| formation voltage (V) | 30 | 30 | 20 | 20 | 140 | 140 | 30 | 16 | 10 |

TABLE 4-continued

Properties of Agglomerated Particles

| | example 1 | comp. 1 | example 2 | comp. 2 | example 3 | comp. 3 | example 4 | example 5 | example 6 |
|---|---|---|---|---|---|---|---|---|---|
| CV (μFV/g) | 86500 | 85400 | 151800 | 145010 | 19800 | 18900 | 85600 | 145,200 | 221,500 |
| DCL (nA/CV) | 0.65 | 0.66 | 0.72 | 0.74 | 0.32 | 0.33 | 0.47 | 1.45 | 1.15 |

As described above, the flowable agglomerated tantalum and/or niobium particles according to the methods of the present invention are characterized by approximately spherical morphology, suitable Scott bulk density, less +80 mesh coarse particles and less −325 mesh fine particles, higher flow rate and higher green pellet crush strength than the conventional powder. The anodes sintered from the powder produced by the methods of the present invention have more centralized pore size distribution in the range of 0.2 μm~0.6 μm, less pores less than 0.2 μm and less pores larger than 1.0 μm than the product obtained with the conventional powder. The flowable agglomerated tantalum and/or niobium particles according to the methods of the present invention are advantageous in impregnating with electrolytic and cathode materials and decreasing ESR of the solid electrolytic capacitors. The electrolytic capacitor anodes manufactured from the powder produced by the methods of the present invention have high CV and low DC leakage.

Other embodiments of the present invention will be apparent to those skills in the art from consideration of the specification and practice of the present invention disclosed herein. It is intended that the specification and examples be considered as exemplary only, with a true scope and spirit of the present invention being indicated by the following claims.

The embodiments of the invention in which an exclusive property or privilege is claimed are defined as follows:

1. A method for spherically granulating and agglomerating metal particles comprising:
   (a) comminuting the metal particles to form fine particles having D50 less than about 50 μm;
   (b) combining the comminuted metal particles with a volatile liquid;
   (c) granulating the comminuted metal particles combined with the volatile liquid in a granulator to form wet particles;
   (d) still drying the wet particles and removing the volatile liquid to form flowable pre-agglomerated particles with increased bulk density, wherein said flowable pre-agglomerated particles have a size of less than about 1000 μm and a flow rate of not less than 2.0 g/sec;
   (e) heat treating the pre-agglomerated particles; and
   (f) screening the heat treated particles to obtain flowable agglomerated particles, wherein said flowable agglomerated particles are of spherical morphology.

2. The method of claim 1, wherein said metal particles comprise tantalum and/or niobium particles.

3. The method of claim 1, wherein said flowable pre-agglomerated particles in the step (d) have a size of less than about 500 μm.

4. The method of claim 1, wherein said volatile liquid in step (b) is de-ionized water or an aqueous solution.

5. The method of claim 1, wherein said comminuted metal particles combined with said volatile liquid of step (c) has an amount of from about 2 wt % to about 50 wt % of the comminuted metal particles.

6. The method of claim 1, wherein drying the wet pre-agglomerated particles in step (d) is accomplished by heating them in a dryer at a temperature from about 50° C. to about 200° C. for at least 16 hours.

7. The method of claim 1, wherein the ratio of a Scott bulk density of the pre-agglomerated particles to a Scott bulk density of the comminuted particles is greater than 1.

8. The method of claim 2, wherein step (e) includes heat treating the tantalum and/or niobium particles under vacuum at a temperature from about 850° C. to about 1700° C. for from about 20 minutes to 60 minutes.

9. The method of claim 1, wherein the flowable agglomerated particles are tantalum particles.

10. The method of claim 1, wherein the flowable agglomerated particles are niobium particles.

11. The method of claim 9, wherein the flow rate is not less than 2.5 g/sec.

12. The method of claim 11, wherein the flow rate is not less than 2.7 g/sec.

13. The method of claim 12, wherein the flow rate is not less than 4 g/sec.

14. The method of claim 10, wherein the flow rate is not less than 2.5 g/sec.

15. The method of claim 14, wherein the flow rate is not less than 2.7 g/sec.

* * * * *

UNITED STATES PATENT AND TRADEMARK OFFICE
CERTIFICATE OF CORRECTION

PATENT NO. : 7,666,247 B2  Page 1 of 1
APPLICATION NO. : 11/356723
DATED : February 23, 2010
INVENTOR(S) : J. He et al.

It is certified that error appears in the above-identified patent and that said Letters Patent is hereby corrected as shown below:

On the Title Page

| Item (54) | Title | "PATRICLES" should read --PARTICLES-- |
| Col. 1 | Line 5 | "PATRICLES" should read --PARTICLES-- |

On the Title Page:

The first or sole Notice should read --

Subject to any disclaimer, the term of this patent is extended or adjusted under 35 U.S.C. 154(b) by 768 days.

Signed and Sealed this

Twelfth Day of October, 2010

David J. Kappos
*Director of the United States Patent and Trademark Office*